United States Patent

[11] 3,578,820

| [72] | Inventor | Hugh E. Riordan |
| | | Ann Arbor, Mich. |
| [21] | Appl. No. | 850,933 |
| [22] | Filed | Aug. 18, 1969 |
| [45] | Patented | May 18, 1971 |
| [73] | Assignee | Kelsey-Hayes Company |
| | | Romulus, Mich. |

[54] TWO-WHEEL SKID CONTROL BY MODULATION OF BRAKE POWER BOOSTER
8 Claims, 1 Drawing Fig.

[52] U.S. Cl............................................ 303/21,
188/181, 303/13
[51] Int. Cl............................................ B60t 8/12,
B60t 13/10
[50] Field of Search........................................ 303/21, 6,
24, 61—63, 68, 69, 10, 13; 188/181

[56] References Cited
UNITED STATES PATENTS

| 3,325,226 | 6/1967 | Perrino........................ | 303/21 |
| 3,401,986 | 9/1968 | Walker et al. ................ | 303/21 |
| 3,415,577 | 12/1968 | Walker........................ | 303/21 |
| 3,433,536 | 3/1969 | Skinner........................ | 303/21 |

*Primary Examiner*—Milton Buchler
*Assistant Examiner*—John J. McLaughlin
*Attorney*—Harness, Dickey & Pierce

ABSTRACT: A skid control system for a vehicle having front and rear wheels in which the brakes of the rear wheels are to be skid controlled and with a system utilizing a power booster, this system including means for locking in the pressure to the front brakes upon the occurrence of a skid control signal, at which time the power booster is relieved whereby the pressure to the rear brakes is relieved.

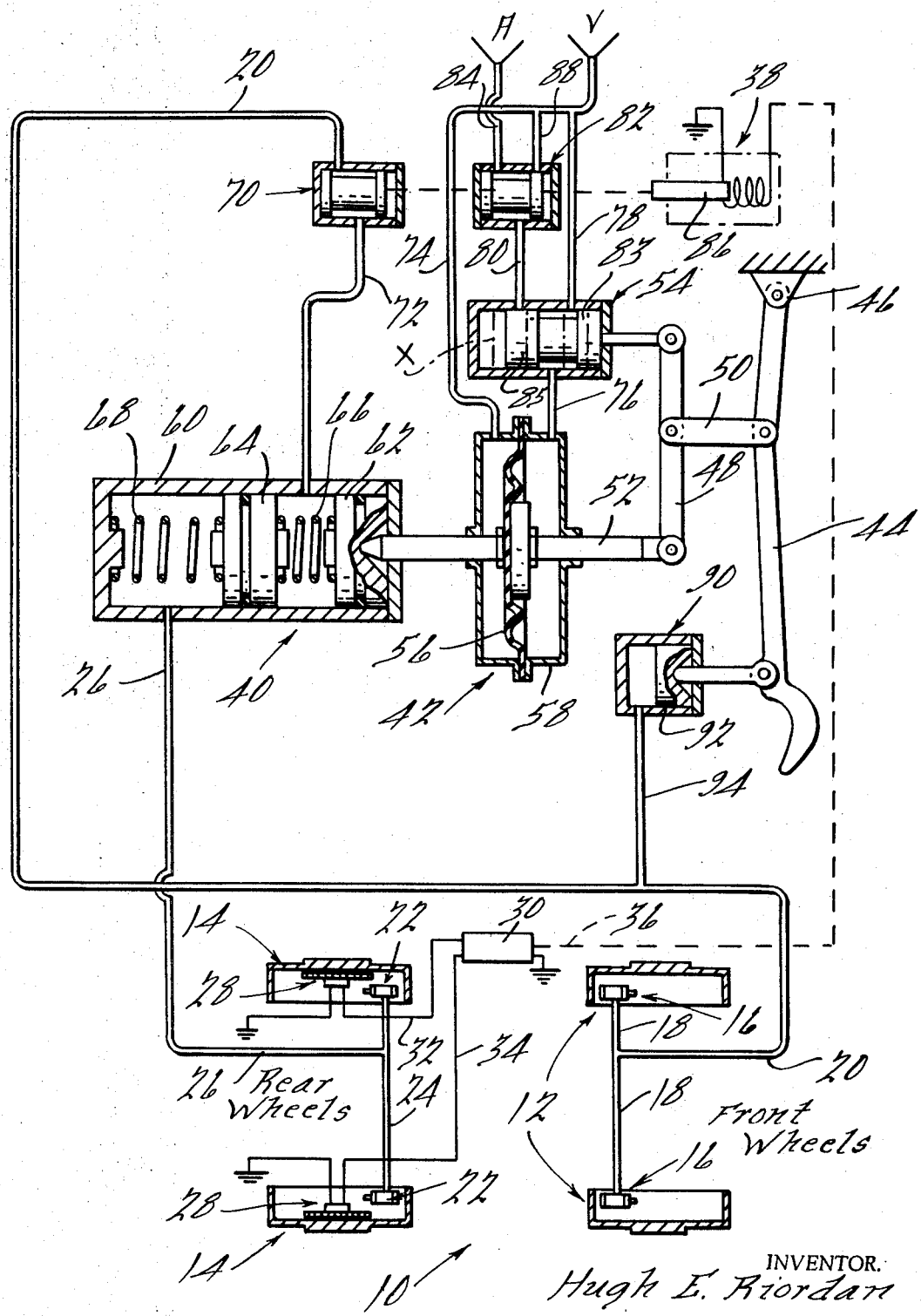

TWO-WHEEL SKID CONTROL BY MODULATION OF BRAKE POWER BOOSTER

BACKGROUND OF THE INVENTION

The present invention relates to skid control systems and, more particularly, to a skid control system for a vehicle including at least four wheels having a power booster brake system in which the pressure to either the fronts or the rears is reduced in response to an incipient skid condition with the pressure to the other wheels being locking in at that pressure present prior to the occurrence of the skid condition.

It is desirable to provide an inexpensive skid control system for an automotive vehicle having a brake system including a power booster by controlling the power booster. Normally, however, a common power booster controls pressure to both the fronts and the rears. In a skid control system for a four-wheeled vehicle in which the incipient skid condition is detected at only two of the wheels, it is desirable to control the pressure at only those two and to maintain the original pressure at the other two. This can be done by controlling the power booster such as to modulate the pressure to the rear brakes while maintaining the pressure to the fronts constant. Therefore, in the present invention, it is proposed to control the power booster to modulate the pressure to the wheels being skid controlled while locking in the pressure to those wheels not being skid controlled in response to the detection of a skid condition. The result is a relatively simple and inexpensive two-wheel skid control system.

Therefore, it is an object of the present invention to provide a novel and relatively inexpensive two-wheel skid control system for four-wheel vehicles. It is another object of the present invention to provide a skid control system of the above type for systems including a power booster by controlling the power booster whereby pressure to brakes to the two skid-controlled wheels is modulated while the pressure to the other two nonskid-controlled wheels is locked in.

Further advantages and benefits of the present invention will become apparent upon a reading of the description of the preferred embodiments taken in conjunction with the accompanying drawing.

DESCRIPTION OF THE DRAWING

The FIGURE is a partial schematic and diagrammatic view of a system exemplifying features of the present invention.

Looking now to the drawing, an automotive vehicle generally indicated by the numeral 10 is provided with front wheels 12 and rear wheels 14. The front wheels 12 are provided with brake assemblies 16 which are actuated by fluid conduits 18 and 20 while the rear wheels 14 are provided with brake assemblies 22 which are actuated by fluid conduits 24 and 26. The rear wheels 14 are provided with speed sensors 28 which provide an electrical signal to a module 30 via lines 32 and 34. The module 30 receives the wheel velocity information from the sensors 28 and upon the detection of an incipient skid condition at the rear wheels 14 provides an output signal via a conductor 36 to energize a force motor or solenoid generally indicated by the numeral 38. Actuation of the force motor 38 results in relief of the rear brake pressure in a manner to be described.

The braking system for the front and rear wheel brake assemblies includes a dual master cylinder 40 and a power booster 42. The booster 42 is actuated by a brake pedal 44 which is pivotally mounted at its upper end 46 and is connected to the power booster 42 via an arm 48 and a link 50. The link 50 has one end pivotally connected to the brake pedal 44 intermediate its ends and has its opposite end connected generally intermediate the ends of the member 48. The lower end of the member 48 is connected to a drive piston 52 of the power booster 42 while the upper end of the member 48 is connected to a power-actuating valve 54. The booster 42 including the valve 54 can be of a conventional construction known to those skilled in the art and is represented here diagrammatically for purposes of simplicity. The rod 52 is connected to a diaphragm 56 located within an enclosed housing 58 with the rod 52 extending outwardly of the housing 58 for engagement with the master cylinder 40. Note again, that the dual master cylinder 40 can be of a conventional construction known to those skilled in the art and for purposes of simplicity is represented diagrammatically only. The dual master cylinder 40 includes an enclosed housing 60 having a first piston 62 and a second piston 64 separated by spring member 66 with the piston 64 urged outwardly from the housing 60 by means of a spring 68. The line 26 from the rear brake mechanism 22 is connected to the portion of the housing defined by the inner end of the housing 60 and by the piston 64. Hence, actuation of the power booster 42 resulting in an inward movement of the piston 64 will result in pressurization of the brakes 22 via the conduit 26. The conduit 20 to the front wheel brakes 16 is connected to the portion of the cylinder of the housing 60 between the pistons 62 and 64 by means of a pressure latching valve 70 and a conduit 72. The pressure latching valve 70 is normally open, i.e. connecting conduit 72 and 20 and hence normally, when the power booster 42 is actuated to move the piston 62 into the housing 60, the front wheel brakes 16 will be pressurized. The power booster 42 normally has both ends of the diaphragm 56 connected to a source of vacuum V. The forward end is connected to the vacuum source V by means of a conduit 74. The rearward end of the diaphragm 56 is normally connected to vacuum through the actuating valve 54 via conduit 76 and 78. The actuating valve 54 is normally in a deactuated position, as shown, whereby the conduits 76 and 78 are maintained in communication with each other. The actuating valve 54 has an alternate position, whereby the conduit 76 will be connected to atmospheric air via a conduit 80, a control valve 82 and a conduit 84. The control valve 82 is normally in a position connecting conduits 84 and 80 to atmospheric air. In operation, then, upon depression of the brake pedal 44, member 48 will be pivoted by the link 50 such as to move the actuating valve 54 to its alternate position at which the conduit 76 will be disconnected from vacuum (i.e. line 78 blocked by land 83) and will be connected to air (i.e. line 80 uncovered by land 85) via conduits 80 and 84 and control valve 82. With pressure admitted to the actuating side of the diaphragm 56 the rod 52 will be moved to pressurize the front and rear brakes. As rod 52 moves (in accordance with conventional booster constructions), the lands 83 and 85 on the spool of valve 54 will be eventually moved to an intermediate position X between the conduits 78 and 80; in the intermediate position X both conduits 78 and 80 are blocked by lands 83 and 85, respectively, from conduit 76 whereby the position of the rod 52 will be maintained and the pressure to the front and rear brakes will be maintained. Upon further depression of the pedal 54 for increased pressure, the valve 54 will be again moved such as to open the passageway between conduits 76 and 80 resulting in further movement of the rod 52 and further increase in pressure; of course, upon release of the brake pedal 44, the control rod 54 will move back to its original position connecting conduit 76 and 78 to vacuum resulting in complete release of pressure. The operation of the booster 42 including the actuating valve 54 as described is in conformance with known booster constructions. The solenoid or force motor 38 has an actuating rod 86 which is connected both to the control valve 82 and to the latching valve 70. Upon occurrence of a skid control condition as detected at the rear wheels 14 of the vehicle via the sensors 28 and module 30 a control signal is provided at conduit 36; the solenoid 38 will be actuated to move the rod 86 in a direction such as to move the control valve 82 into an alternate position connecting the conduit 80 to vacuum via conduit 88. At the same time, the latching valve 70 is moved to its alternate position which merely disconnects conduit 72 from the conduit 20 to the front wheel brakes 16. In this condition, the booster 42 will be deenergized and the rod 52 will then be moved rearwardly since both sides of the diaphragm 56 will be connected to vacuum; this will result in a relief in pressure to the rear brakes 22. At the same time, however, the pressure to the front wheel brakes 16 cannot be relieved since the latching valve 70 has been moved to its alternate position and the original pressure just prior to the occurrence of the incipient skid signal is maintained. Upon termination of skid condition and of the skid control signal, the latching valve 70 will then be moved to its original position whereby the brake pressure will then again be controlled by the pressure in the master cylinder 40. At the same time, of course, the control valve 82 will be moved to its original position permitting the power booster 42 to be connected to atmospheric air and hence permitting reapplication of the brakes via the power booster 42.

Note that the system as shown also provides for a push-through feature; in the event of loss of power for the booster 42, the brakes can be applied directly through the rod 52 via the member 48 and link 50. In order to provide pedal feel to the brake pedal 44, a pedal feel cylinder 90 is provided having a piston 92 connected to the brake pedal 44; the piston 92 is actuated to oppose the brake pedal force with a magnitude related to the fluid pressure to the front brakes 16 via conduit 94. If the latching valve 70 should fail, the pedal feel cylinder 90 will provide manual operation of the front brakes.

Thus, with the system as shown and described, a simplified two-wheel skid control system can be provided with only the rear wheels being skid controlled and with the pressure in the front wheels being maintained generally at the original level just prior to the occurrence of the skid control condition. The skid control system can be accomplished with a minimum amount of hardware and with the use of conventional boosters.

While it will be apparent that the preferred embodiments of the invention disclosed are well calculated to fulfill the objects above stated, it will be appreciated that the invention is susceptible to modification, variation and change without departing from the proper scope or fair meaning of the invention.

I claim:

1. In a skid control system for an automotive vehicle having a set of front brakes and a set of rear brakes actuable by a common power booster, said system comprising: skid control means connected to one set of brakes for providing a control signal upon occurrence of an incipient skid condition at the wheels for said one set of brakes, control means for deactuating the power booster in response to said control signal whereby pressure will be relieved to said one set of brakes, and blocking means associated with the other set of brakes for maintaining the pressure to said other set of brakes during deactuation of the power booster in response to said control signal but permitting pressure relief at said other set of brakes upon deactuation of the power booster in normal braking.

2. The system of claim 1 with the sets of front and rear brakes being hydraulically actuated and with the power booster being pneumatically actuated, said skid control means comprising a first valve member connected to the power booster and having one condition permitting actuation of the booster and another condition for deactuating the power booster and first means for placing said first valve member in said other condition in response to said control signal.

3. The system of claim 2 with the power booster being connected to actuate a dual master cylinder which has one section connected to the one set of brakes and another section connected to the other set of brakes, said blocking means comprising a second valve member actuable in response to said control signal to a blocking condition for blocking the one master cylinder section from said one set of brakes.

4. The system of claim 3 with said one set being the rear brakes.

5. The system of claim 1 with said one set being the rear brakes.

6. The system of claim 4 with the booster being actuable by a brake pedal and further comprising a piston means connected to the brake pedal and to said other set of brakes for resisting pedal movement with a force varying in accordance with variations in the pressure to said other set whereby pedal feel will be provided.

7. The system of claim 6 with said piston means being actuable by the brake pedal in the event of failure of said braking means, to actuate said other set of brakes.

8. The system of claim 1 with the booster being actuable by a brake pedal and further comprising a piston means connected to the brake pedal and to said other set of brakes for resisting pedal movement with a force varying in accordance with variation in the pressure to said other set whereby pedal feel will be provided, said piston means being actuable by the brake pedal in the event of failure of said blocking means, to actuate said other set of brakes.